US008979390B2

(12) United States Patent
Jubin et al.

(10) Patent No.: US 8,979,390 B2
(45) Date of Patent: Mar. 17, 2015

(54) FERRULE OF MULTILAYER WAVEGUIDE CONNECTOR

(71) Applicant: International Business Machines Corporation, Armonk, NY (US)

(72) Inventors: Daniel S. Jubin, Rueschlikon (CH); Norbert M. Meier, Rueschlikon (CH); Bert J. Offrein, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 13/667,741

(22) Filed: Nov. 2, 2012

(65) Prior Publication Data

US 2013/0136399 A1 May 30, 2013

(30) Foreign Application Priority Data

Nov. 28, 2011 (EP) .................................... 11190862

(51) Int. Cl.
*G02B 6/36* (2006.01)
*G02B 6/38* (2006.01)

(52) U.S. Cl.
CPC ............ *G02B 6/3834* (2013.01); *G02B 6/3676* (2013.01)
USPC .............................................. 385/83; 385/78

(58) Field of Classification Search
CPC .. G02B 6/3676; G02B 6/3834; G02B 6/3839; G02B 6/387; G02B 6/3885; G02B 6/3898
USPC ......................................... 385/52, 78, 79, 83
See application file for complete search history.

(56) References Cited

U.S. PATENT DOCUMENTS

| 5,394,495 | A  | * | 2/1995  | Booth et al. ................... 385/59 |
| 6,398,424 | B1 |   | 6/2002  | Jin et al. |
| 6,629,781 | B2 | * | 10/2003 | Shigenaga et al. .............. 385/78 |
| 6,816,654 | B1 |   | 11/2004 | Grabbe |
| 6,817,777 | B1 | * | 11/2004 | Grabbe ......................... 385/59 |
| 7,346,242 | B2 |   | 3/2008  | Morlion et al. |
| 7,853,105 | B2 |   | 12/2010 | Budd et al. |
| 8,529,138 | B2 | * | 9/2013  | Duis et al. ..................... 385/59 |
| 8,582,945 | B2 | * | 11/2013 | Duis et al. .................... 385/137 |
| 8,764,310 | B2 | * | 7/2014  | Duis et al. ..................... 385/65 |
| 2003/0174971 | A1 |   | 9/2003  | Shigenaga et al. |
| 2010/0014815 | A1 | * | 1/2010  | Ohmura et al. ................ 385/83 |
| 2010/0067852 | A1 |   | 3/2010  | Dangel et al. |
| 2010/0074579 | A1 |   | 3/2010  | Fujii et al. |
| 2011/0026882 | A1 |   | 2/2011  | Budd et al. |

FOREIGN PATENT DOCUMENTS

DE 19925015 A1 12/2000
WO 2010103432 A2 9/2010

OTHER PUBLICATIONS

Bruce L. Booth and Jack Fisher, "Practical Optoelectronic Substrate Connectivity," Optical InterLinks, pp. 1-18, 2007.
UKL—Intelectual Property Office; Combined Search and Examination Report Under Sections 17 and 18(3); Application No. GB1219995.6, Mailed: Feb. 14, 2013; pp. 1-6.

* cited by examiner

*Primary Examiner* — Daniel Petkovsek
(74) *Attorney, Agent, or Firm* — Cantor Colburn LLP

(57) ABSTRACT

A ferrule for a multilayer waveguide connector includes a face having mechanical alignment slots arranged in a bidirectional lattice structure, the mechanical alignment slots including first slots disposed in a first direction, the first slots configured to respectively receive one end of waveguide layers, and second slots disposed in a second direction different from the first direction, the second slots configured to respectively receive protrusions transverse from a main surface of the waveguide layers.

11 Claims, 7 Drawing Sheets

Fig. 5
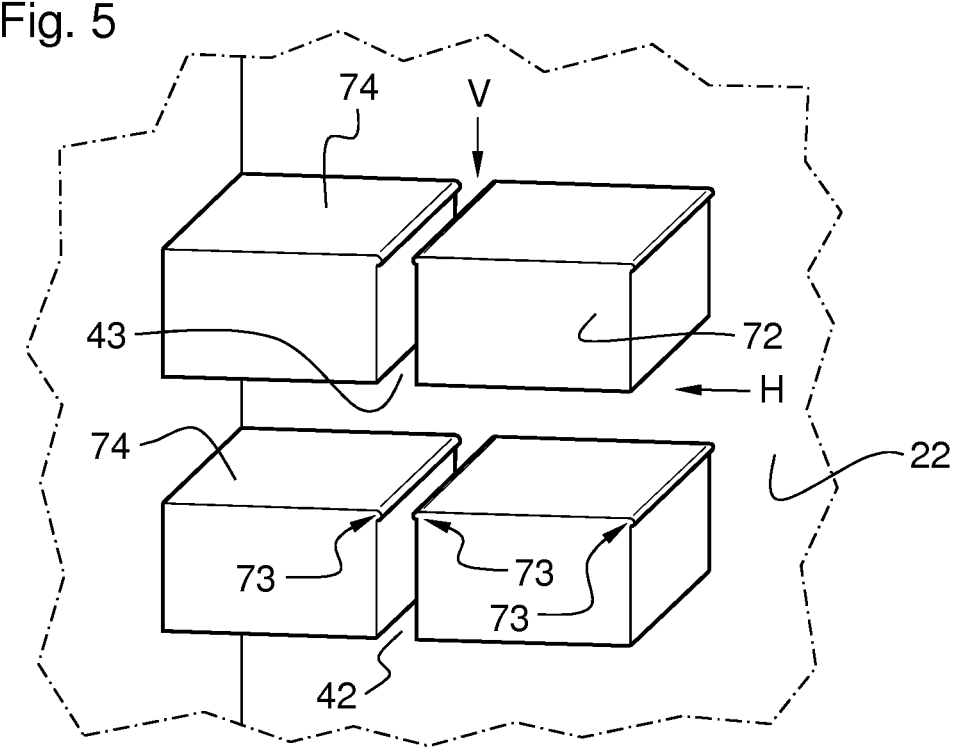
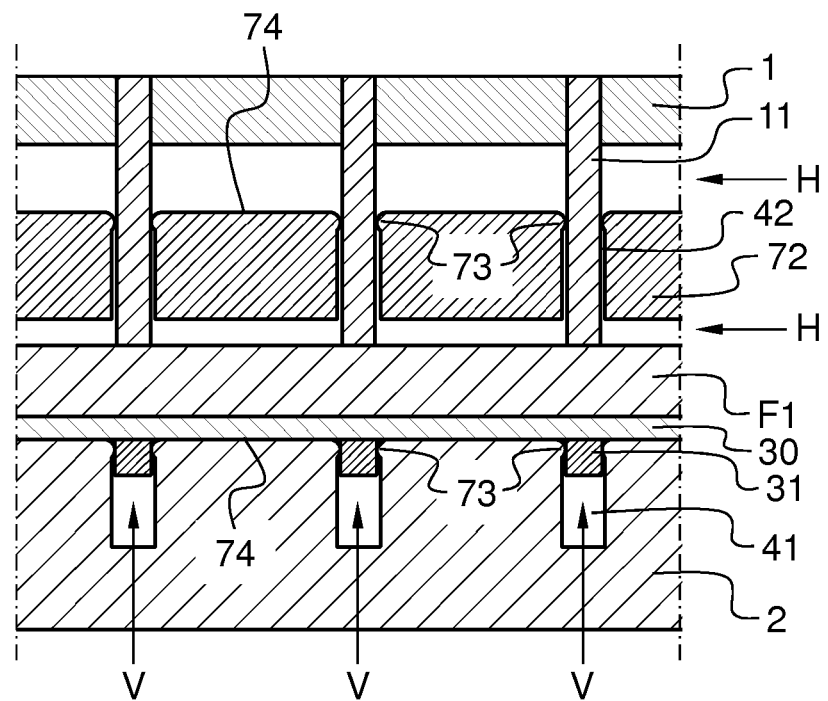
Fig. 6

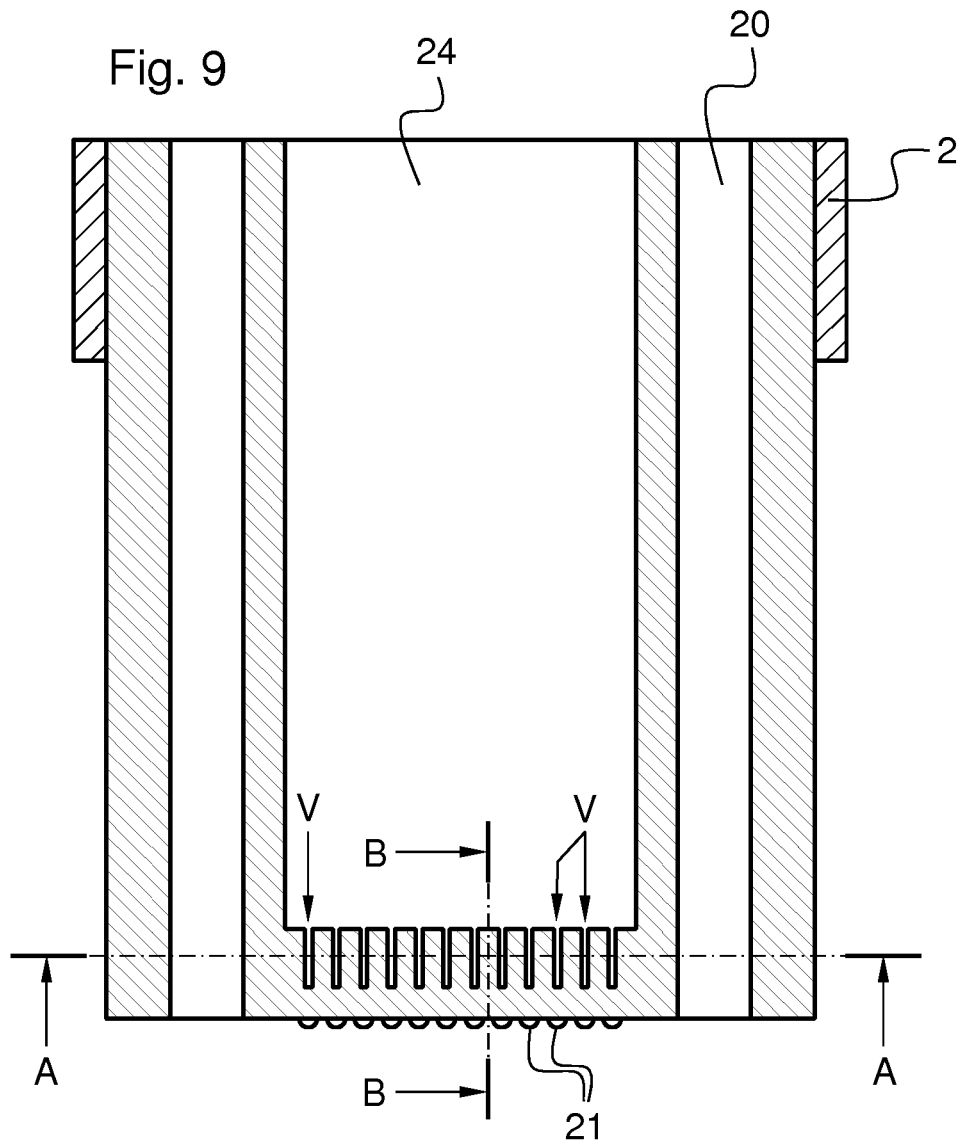

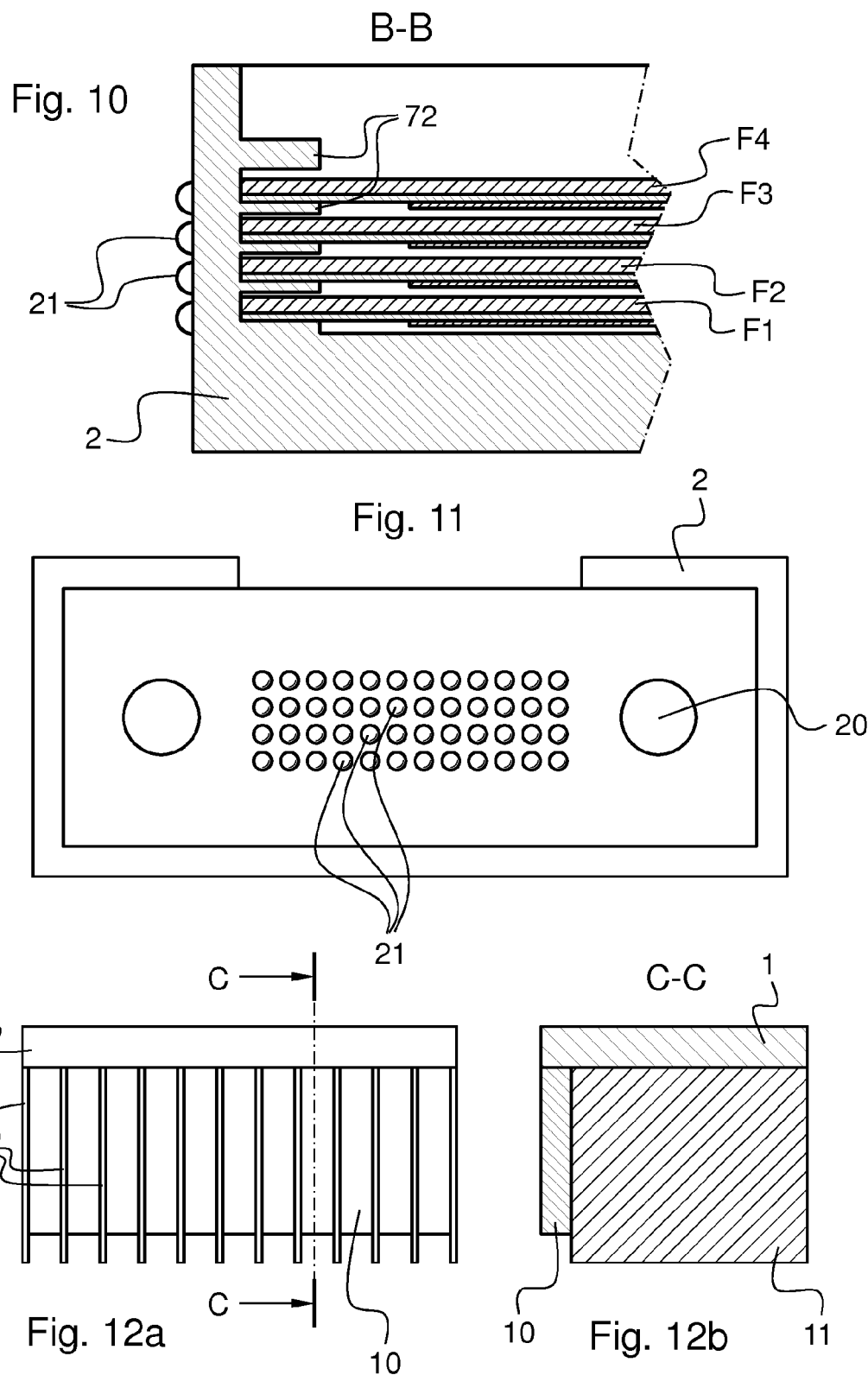

FERRULE OF MULTILAYER WAVEGUIDE CONNECTOR

PRIORITY

This application claims priority to European Patent Application No. 11190862.0, filed 28 Nov. 2011, and all the benefits accruing therefrom under 35 U.S.C. §119, the contents of which in its entirety are herein incorporated by reference.

BACKGROUND

The disclosure relates to ferrules of multilayer waveguide connector, stacks of waveguide layers, multilayer waveguide connectors, and methods for connecting a stack of waveguides layers to a face of a ferrule.

US 2010/0067852 discloses a method for assembling a ferrule for an optical waveguide connection, a ferrule for an optical waveguide connector, a waveguide ribbon and a tool for assembling the ferrule.

SUMMARY

In one embodiment, a ferrule for a multilayer waveguide connector includes an end face comprising mechanical alignment slots arranged in a bidirectional lattice structure, the mechanical alignment slots including first slots disposed in a first direction, the first slots configured to respectively receive one end of waveguide layers, and second slots disposed in a second direction perpendicular to the first direction, the second slots configured to respectively receive protrusions transverse from a main surface of the waveguide layers and further aligned to respectively enable teeth of a comb-like assembly tool to be inserted therein; and an array of lenses disposed on a face opposite to the end face, the lenses arranged so as to come in optical communication with cavities of the second slots where the protrusions of the waveguide layers are to be inserted.

In another embodiment, a ferrule for a multilayer waveguide connector includes a face having mechanical alignment slots arranged in a bidirectional lattice structure, the mechanical alignment slots including first slots disposed in a first direction, the first slots configured to respectively receive one end of waveguide layers, and second slots disposed in a second direction different from the first direction, the second slots configured to respectively receive protrusions transverse from a main surface of the waveguide layers.

In another embodiment, multilayer waveguide connector includes a ferrule having a face; and a stack of waveguide layers fixed to the ferrule face; the ferrule face including mechanical alignment slots arranged in a bidirectional lattice structure, the mechanical alignment slots including first slots disposed in a first direction; the first slots configured to respectively receive one end of the stack of waveguide layers, and second slots disposed in a second direction different from the first direction, the second slots configured to respectively receive protrusions transverse from a main surface of the stack of waveguide layers.

In another embodiment, a multilayer waveguide connector includes a stack of waveguide layers; and a ferrule including a wall presenting two opposite faces, one of the opposite faces including mechanical alignment structure where one end of the stack is fixed; and the other one of the opposite faces comprising an array of lenses in optical communication with the stack.

In another embodiment, a method for connecting a stack of waveguide layers to a face of a ferrule presenting a mechanical alignment structure includes bringing a ferrule in an alignment position; for each waveguide layer, dispersing glue in cavities of mechanical alignment structure; sliding the waveguide layer into the cavities; and inserting a comb-like tool in the ferrule so that the tool presses the waveguide layer into the cavities; glue curing the ferrule; and adding a cover to the ferrule.

BRIEF DESCRIPTION OF THE SEVERAL VIEWS OF THE DRAWINGS

Referring to the exemplary drawings wherein like elements are numbered alike in the several Figures:

FIG. 5 shows a 3D view of a detail of a ferrule, according to embodiments;

FIG. 6 shows a view of a ferrule, a waveguide layer and an assembly tool assembled together, as in embodiments;

FIG. 8 shows a view of a ferrule and of a stack of waveguide layers assembled together, according to embodiments;

FIG. 9 shows a view of a ferrule seen from another point of view than FIG. 8, according to embodiments;

FIG. 10 shows a view of a ferrule and a waveguide layer, seen from still another point of view than FIG. 8, according to embodiments;

FIG. 11 shows a ferrule and a waveguide layer, seen from still another point of view than FIG. 8, according to embodiments;

FIGS. 12*a-b* show views from different points of view of an assembly tool, as used in embodiments.

DETAILED DESCRIPTION

A multilayer polymer waveguide-based lensed connector is disclosed. The waveguide layers are aligned into the lensed connector ferrule using mechanical alignment features integrated in the face of the lensed connector ferrule. Each optical waveguide layer is aligned onto a distinct set of mechanical alignment features in the ferrule, hence avoiding an accumulation of alignment errors. The layers of the stack of waveguide layers are, in an exemplary embodiment, all spaced apart and not stacked directly on one other. The ferrule may include an array of optical lenses which are optically connected to the waveguide layers of the stack when the stack is connected in the ferrule.

Figure 1:
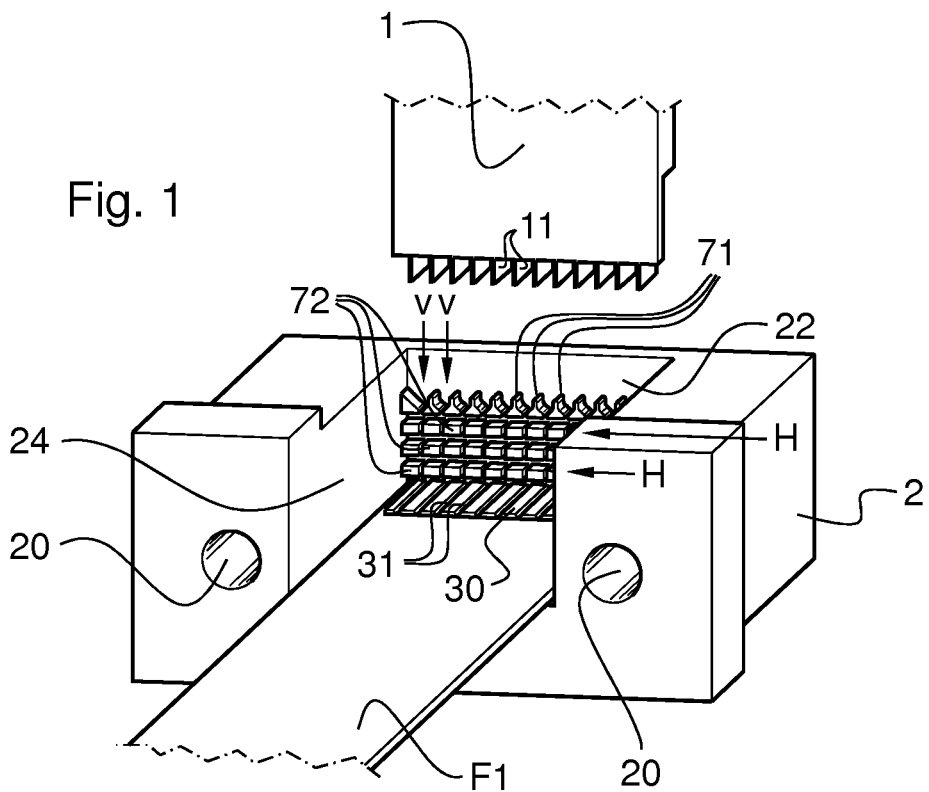
FIG. 1 shows a three dimensional (or "3D") view of a ferrule, a waveguide layer and an assembly tool, according to embodiments.

FIG. 1 shows a 3D view of a ferrule, a waveguide layer and an assembly tool. A waveguide layer F1 is inserted and fixed in a ferrule 2 with the help of an assembling tool 1. The ferrule 2 comprises holes 20 and a recess 24. On a face 22 of the recess 24 there is a lattice of protrusions 72 which define alignment slots, namely horizontal alignments slots H and vertical alignment slots V. Above the lattice of protrusions 72, there is a row of conical protrusions 71 helping guiding teeth 11 of assembly tool 1. A waveguide layer F1 has an end 30 comprising protrusions 31 extending transversely from main surface of waveguide layer F1. The waveguide layer F1 is horizontally inserted in the recess 24 of ferrule 2 in a manner such that end 30 of waveguide layer F1 goes into a horizontal alignment slot H, and such that ends of protrusions 31 go into vertical alignment slots V. When waveguide layer F1 is put in position, then assembly tool 1 moves downwardly and teeth 11 of assembly tool 1 press end 30 of waveguide layer F1 against protrusions 72 after having been guided between conical protrusions 71.

Figure 2:
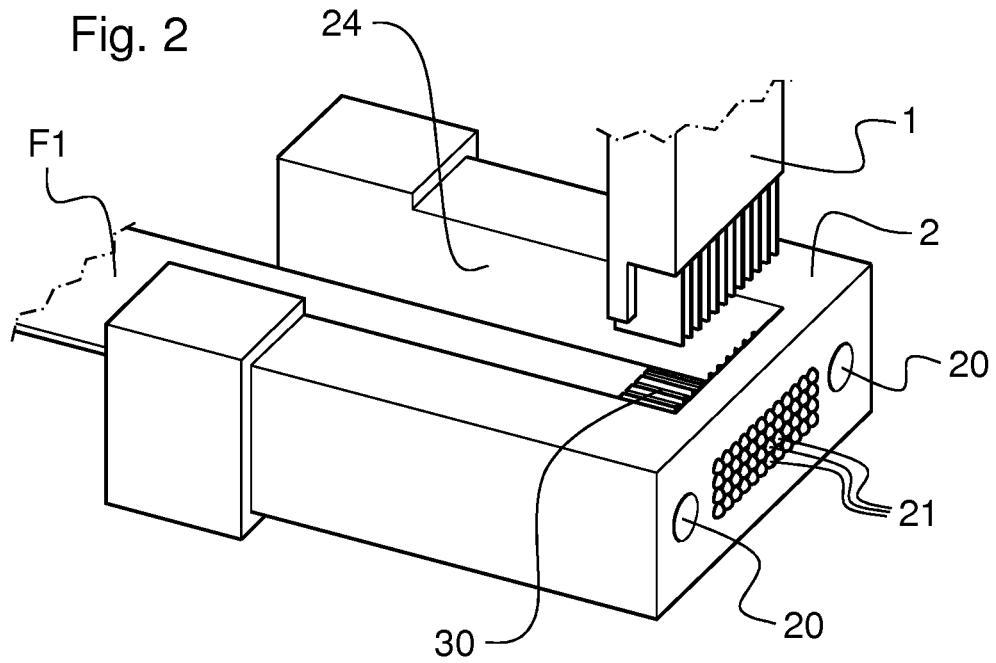
FIG. 2 shows a 3D view of a ferrule, a waveguide layer and an assembly tool, seen from another point of view than FIG. 1, and according to embodiments.

FIG. 2 shows a 3D view of a ferrule, a waveguide layer and an assembly tool, seen from another point of view than FIG. 1. On an exterior face of the ferrule 2, outside the recess 24, more precisely on the face which is opposite to the face 22 comprising the mechanical alignment slots H and V, the ferrule 2 comprises an array of lenses 21.

Figure 3:
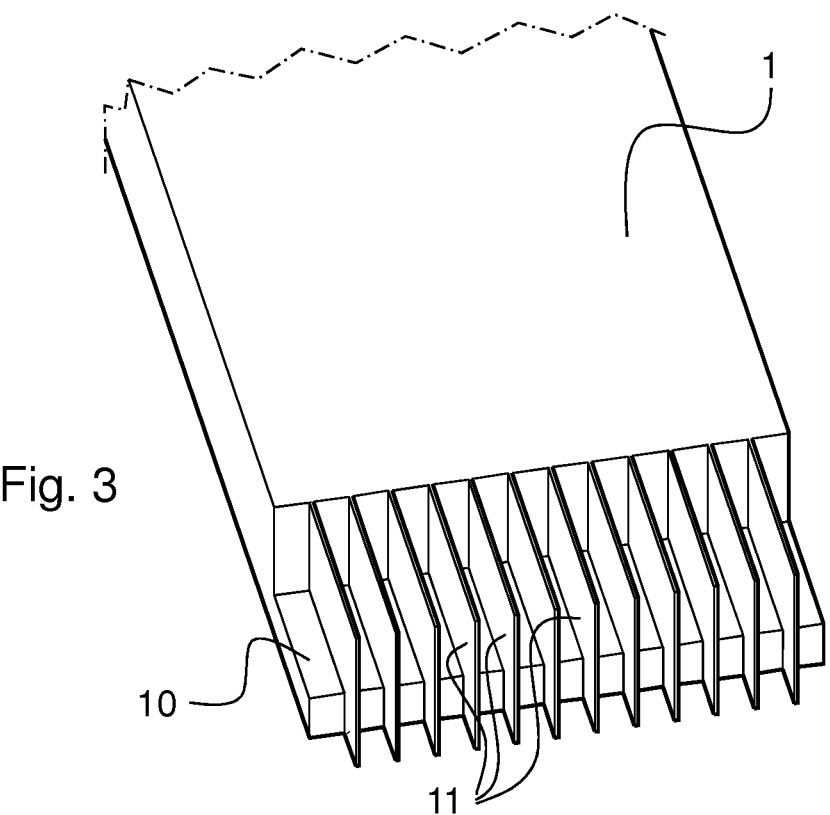
FIG. 3 shows a 3D view of an assembly tool, as used in embodiments.

FIG. 3 shows a 3D view of an assembly tool. The comb-like assembly tool 1 comprises teeth 11 located at an end 10 of the assembly tool 1.

Figure 4:
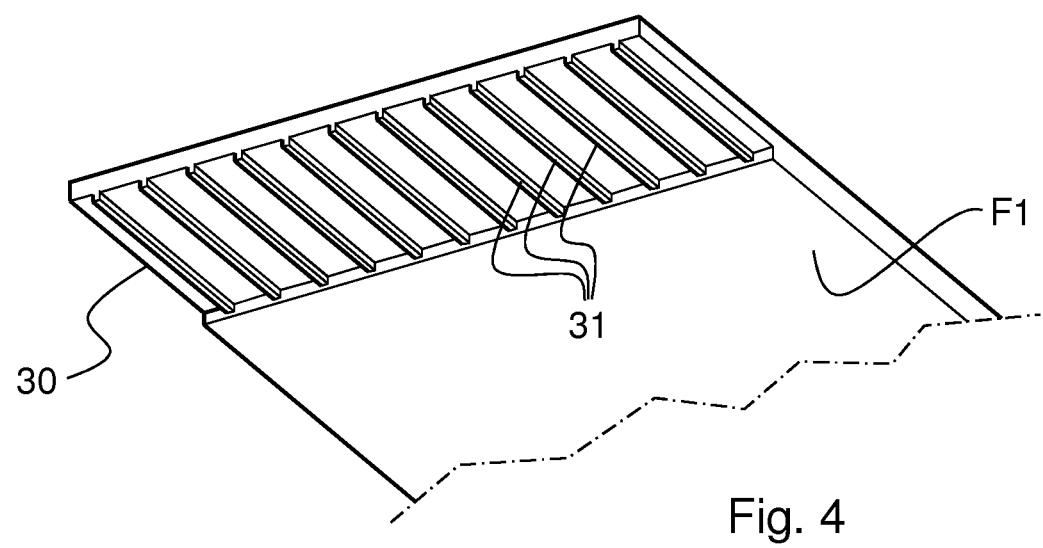
FIG. 4 shows a 3D view of a waveguide layer, according to embodiments.

FIG. 4 shows a 3D view of a waveguide layer. At an end 30 of the waveguide layer F1, there are protrusions 31 extending transversely from main surface of waveguide layer F1. The protrusions 31 are parallel to one another, and comprise optical cores which guide light through waveguide layer F1.

FIG. 5 shows a 3D view of a detail of a ferrule. On face 22 of the recess 24 of the ferrule 2, there is a lattice of protrusions 72 making alignment slots, some of which are horizontal H, some of which are vertical V. The vertical spaces 43 between the protrusions 72 are going to receive protrusions 31 of end 30 of waveguide layer F1 or of another waveguide layer similar to waveguide layer F1. The waveguide layer will go into a horizontal alignment slot H and will be lying against the upper surface 74 of a row of protrusions 72. The protrusions 31 of waveguide layer will be guided in spaces 43 due to the inward protrusions 73 of all protrusions 72. The inward protrusions 73 make the spaces 43 narrower so that protrusions 31 of waveguide layer are more exactly positioned with respect to the lattice of protrusions 72.

FIG. 6 shows a view of a ferrule, a waveguide layer and an assembly tool assembled together. Here, the different elements are shown assembled together. Protrusions 31 of end 30 of waveguide layer F1 are in vertical alignment slots V, and more precisely in cavities 41. Those protrusions 31 are exactly positioned with respect to cavities 41 thanks to inward protrusions 73 of protrusions 72 narrowing locally the cavities 41. Waveguide layer F1 is lying against horizontal surface 74 of a row of protrusions 72. Teeth 11 of assembly tool 1 pass through cavities 42 of vertical alignment slots V until they come and press against upper surface of waveguide layer F1 which is then exactly in the right position with respect to ferrule 2. Then glue can be introduced around end 30 of waveguide layer F1 to fix it within the alignment slots H and V of ferrule 2.

Figure 7:
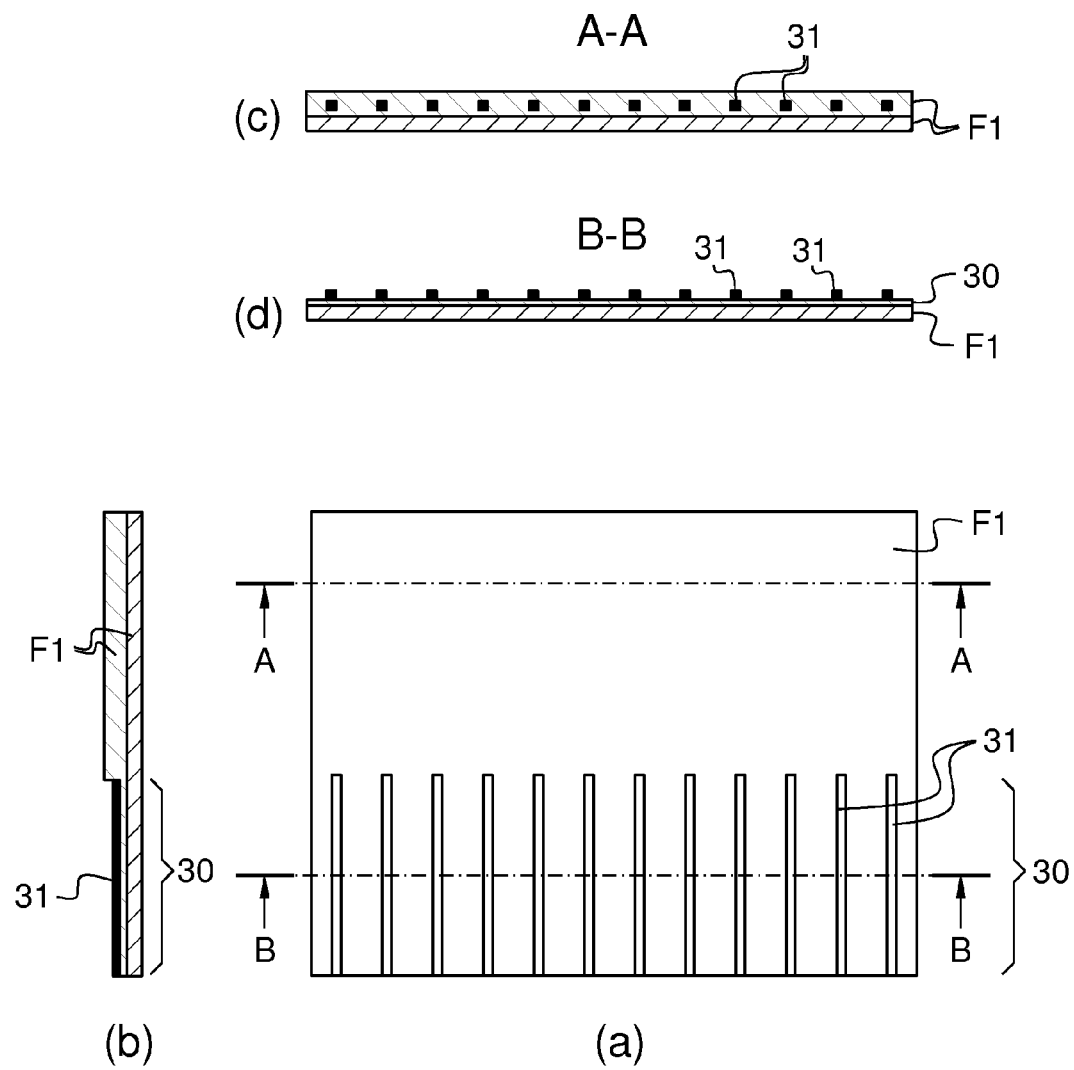
FIGS. 7*a-d* show different views of a waveguide layer, according to embodiments.

FIGS. 7a, 7b, 7c, 7d show views from different points of view of a waveguide layer. FIG. 7a is a top view of the under side of waveguide layer F1. Protrusions 31 extend vertically from main surface of waveguide layer F1 at one end 30 of waveguide layer F1. FIG. 7b is a side view of FIG. 7a. FIG. 7c is a view along cut A-A on FIG. 7a, whereas FIG. 7d is a view along cut B-B on FIG. 7a.

FIGS. 7a to 7d show that the upper cladding is removed over a length of about 1 millimeter (mm) or less at the facet end 30 of waveguide layer F1 that will be connected to face 22 of ferrule 2. This type of structuring can be realized easily during waveguide manufacturing. Additionally, the facet quality of the waveguide layer F1 end 30 to connect need not be of optical quality, which means that the surface roughness given by the dicing technique can be relatively large, thus allowing different facet preparation methods such as simple sawing. This is due to the optical quality glue used later.

FIG. 8 shows a view of a ferrule and of a stack of waveguide layers assembled together. The ferrule 2 comprises alignment structure including protrusions 72 and 71. A stack of waveguide layers F1, F2, F3 and F4, is inserted in recess 24 of ferrule 2. Protrusions 31 of end 30 of waveguide layer F1 are inserted in cavities 41 of vertical alignment slots V so as to be exactly put in position with respect to alignment protrusions 72 of ferrule 2. Protrusions 31 of end 30 of waveguide layer F2 are inserted in cavities 42 of vertical alignment slots V so as to be exactly put in position with respect to alignment protrusions 72 of ferrule 2. Protrusions 31 of end 30 of waveguide layer F3 are inserted in cavities 43 of vertical alignment slots V so as to be exactly put in position with respect to alignment protrusions 72 of ferrule 2. Protrusions 31 of end 30 of waveguide layer F4 are inserted in cavities 44 of vertical alignment slots V so as to be exactly put in position with respect to alignment protrusions 72 of ferrule 2.

A polymer multilayer waveguide-based lensed connector includes a transparent ferrule containing lenses 21 and horizontal and vertical alignment slots H and V for positioning every individual polymer waveguide layer F1 to F4. The polymer waveguide layers F1 to F4 contain free standing core waveguides in the area of the connector which are the protrusions 31. These free standing cores 31 align to the lensed connector ferrule 2. A transparent glue is used to fix the waveguide layers F1 to F4 in the lensed ferrule 2. This transparent glue may, in one embodiment, be made of the same material as the cladding of the optical waveguide layer. The waveguide layers are, for example, polymer waveguide layers. The protrusions 31 of waveguide layers F1 to F4 are waveguide cores adapted to guide light within waveguide layers F1 to F4.

The multilayer waveguide connector comprises a stack of waveguide layers F1, F2, F3 and F4, a ferrule 2 including a wall presenting two opposite faces. One of the opposite faces, face 22, includes a mechanical alignment structure which is the lattice of protrusions 72 where one end 30 of the stack is fixed. The other of the opposite faces comprises an array of lenses 21 in optical communication with the stack of waveguide layers F1 to F4.

The stack of waveguide layers F1 to F4 comprises, at one of its ends, at the end 30, protrusions 31 transversal from main surface of waveguide layers F1 to F4 arranged so as to be able to cooperate with mechanical alignment slots H and V of a ferrule 2 arranged in a bidirectional lattice structure of protrusions 72 in order to be fixed into horizontal H and vertical V alignment slots so as to make a multilayer waveguide connector.

FIG. 9 shows a view of a ferrule seen from another point of view than FIG. 8. FIG. 9 shows a top view of the ferrule 2 and a top view of its recess 24. Only the upper row of protrusions, the row of conical protrusions 71, can be seen since they mask other protrusions 72 which are invisible in this view. Between protrusions 71, there are the vertical alignment slots V. The array of lenses 21 is on an exterior face of ferrule 2. Here, FIG. 8 is a cut view along A-A whereas FIG. 10 is a cut view along B-B.

FIG. 10 shows a view of a ferrule and a waveguide layer, seen from still another point of view with respect to FIG. 8. All waveguide layers F1 to F4 are exactly put in place with respect to ferrule 2 thanks to lattice of protrusions 72 so that their cores are in optical communication with lenses 21. The array of lenses 21 is in optical communication with the optical cores of the stack of waveguide layers F1 to F4, one lens 21 per optical core.

FIG. 11 shows a view of a ferrule and a waveguide layer, seen from still another point of view than FIG. 8. The lattice structure of the array of lenses 21 corresponds to the lattice structure of protrusions 72.

In FIGS. 8 to 11 the material used to fix the polymer waveguide layers F1 to F4 to the ferrule 2 is not represented. The ferrule 2 is made out of material optically transparent at the wavelengths where light has to be transmitted, for example around 850 nanometers (nm) for multimode operation.

In FIGS. 1 to 11, a ferrule 2 of a multilayer waveguide connector, including a face 22 comprising mechanical alignment slots horizontal H and vertical V is arranged in a bidirectional lattice structure. Horizontal alignment slots H in a horizontal direction are designed for respectively receiving one end 30 of waveguide layers F1 to F4. Vertical alignment slots V in a vertical direction perpendicular to a horizontal direction are designed for respectively receiving protrusions 31 transversal from main surface of waveguide layers F1 to F4. Face 22 is an end face of recess 24 of ferrule 2. At least one of the vertical alignment slots V comprises at least one inward protrusion 73 arranged in such a way as to be able to constrain the position of a protrusion 31 of a waveguide layer F1 to F4 inserted in this vertical alignment slot V.

In one embodiment, several but not all vertical alignment slots V comprise such an inward protrusion 73. At least one of the vertical alignment slots V comprises at least two or more inward protrusions 73 arranged in such a way as to be able to constrain the position of a protrusion 31 of a waveguide layer F1 to F4 inserted in this vertical alignment slot V. In another embodiment, several or even all vertical alignment slots V comprise several such inward protrusions 73. The vertical alignment slots V are further aligned to respectively enable teeth 11 of a comb-like assembly tool 1 to be inserted therein. The ferrule 2 further comprises, on a face opposite to the face 22 comprising the mechanical horizontal and alignment slots H and V, an array of lenses 21 which are arranged so as to come in optical communication with the cavities 41, 42, 43 and 44, of vertical alignment slots V where waveguide layers protrusions 31 are to be inserted.

FIGS. 12a, 12b show views from different points of view of an assembly tool. In order to keep the polymer waveguide flex in place in the ferrule, a comb like assembly tool 1 is used. The teeth 11 of this comb are such that they vertically fit through the vertical alignment slots V shown on FIGS. 8 and 9. FIG. 12b is a cut of FIG. 12a along CC. At end 10 of comb-like assembly tool 1, there are the parallel teeth 11. Those teeth 11 will progressively slide in the vertical alignment slots V of ferrule 2 until they come and press against the waveguide layers F1 to F4.

Figure 13:
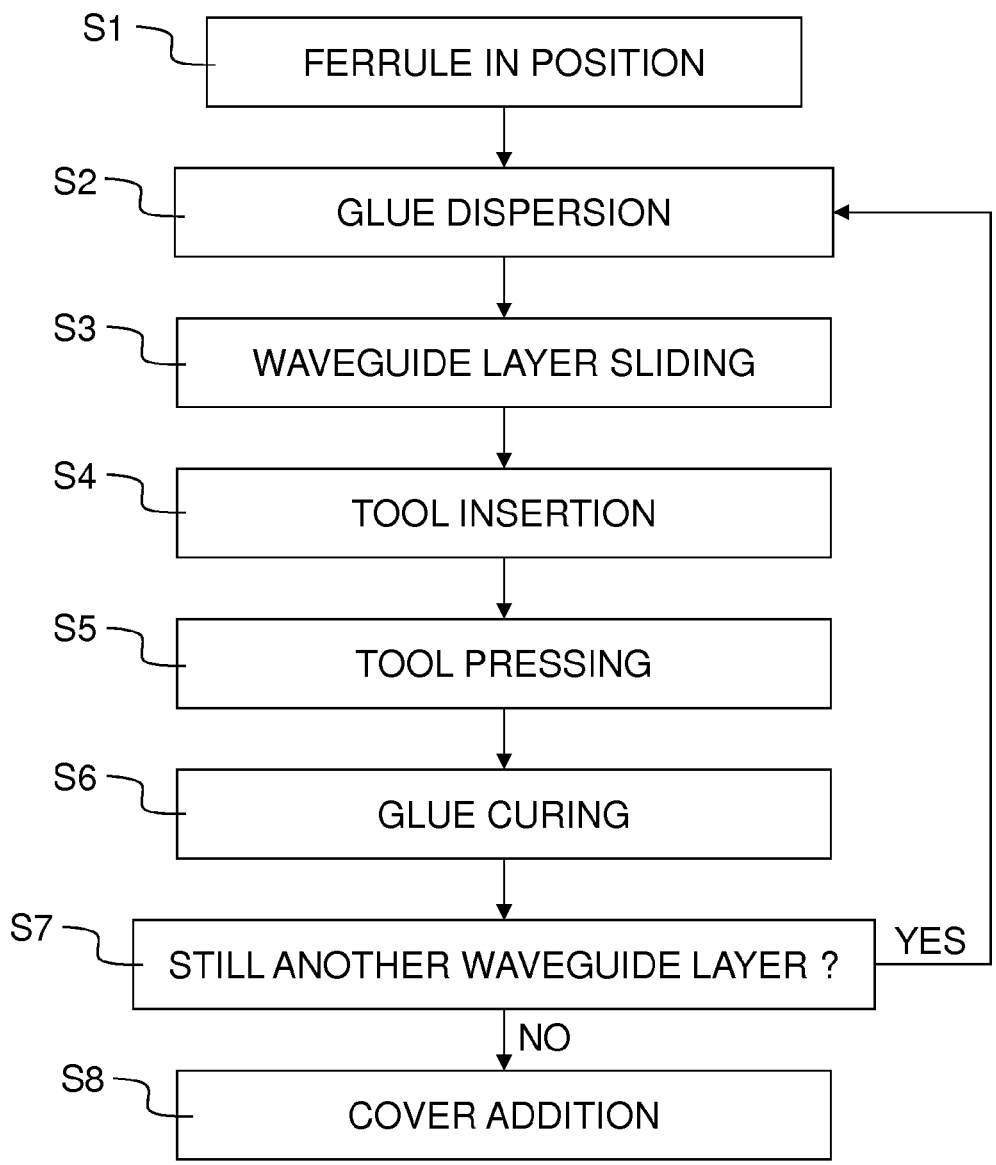
FIG. 13 illustrates various steps involved in of a method for connecting of a stack of waveguides layers to a face of a ferrule, according to embodiments of the invention.

FIG. 13 is a flow diagram illustrating an exemplary connection method according to embodiments. This method connects a stack of waveguides layers F1 to F4 to a face 22 of a ferrule 2 presenting mechanical alignment structure. This method successively comprises a first operation 51 performed once, then a succession of operation S2 to S7 performed for each waveguide layer F1 to F4 of the stack, and afterwards an operation S8 performed once. The operations S2 to S6 may be performed successively or in a different order, for example operation S2 being between operation S5 and operation S6.

The method first comprises an operation S1 of bringing ferrule in an alignment position. Then, for each waveguide layer F1 to F4, the following operations will be performed:

First, in operation S2, glue is dispersed in cavities 41 to 44 of a mechanical alignment structure. Then, in operation, S3 waveguide layers F1 to F4 are slid into cavities 41 to 44, followed by operation S4 of inserting a comb-like assembly tool 1 in ferrule 2 so that it can press, in operation, S5 waveguide layer F1 to F4 into cavities 41 to 44;

Next, in operation S6, glue curing is performed. Then, in decision block (operation) S7, it is determined whether there is another waveguide layer to be inserted. If so, the method returns to operation S2 for more glue dispersion. Otherwise, the method proceeds to operation S8 where a cover is added to the ferrule.

More specifically, in operation S1, the ferrule is brought in position. For waveguide layer F1, in operation S2, a controlled amount of glue is dispersed in the cavities 41 lying at the bottom of vertical alignments slots V. The glue may exhibit an optical index close to the polymer of the cladding of the waveguide layer F1. In operation S3, polymer waveguide layer F1 is slid from the back side into cavities 41. In operation S4, the comb-like assembly tool 1 is inserted via the vertical alignment slots V. The shape of the uppermost layer of protrusions 71 in the ferrule 2, are conical in order to facilitate the insertion and precise position of the teeth 11 of the assembly tool 1. In operation S5, this tool 1 is brought down onto the polymer waveguide layer F1 and presses it on the upper surface 74 of protrusions 72 of the ferrule 2. In operation S6, the glue is cured. Glues with different curing methods can be used. Most common activations are thermal, UV curing (in that case, ferrule 2 needs to be UV transparent) or by using two component epoxy.

Operations S2 to S6 are repeated for all the waveguide layers F2 to F4 of the stack. A control is performed in step S7 to make sure that this repetition is performed until all waveguide layers F1 to F4 of the stack are fixed to the ferrule 2. In operation S8, a cover can be added to the ferrule 2 in order to achieve an overall better mechanical stability of the connector.

As a result of operations S1 to S8, several main advantages of the proposed assembly method can be derived, separately or in combination. First, all the alignment features necessary for a precise alignment of polymer waveguide layers are integrated directly into the ferrule 2. This has a positive impact of the achieved alignment tolerances and expected yield. In addition, each waveguide layer is independently aligned. This makes the concept scalable to many waveguide layers. Further, the array of lenses 21 used in optical coupling is directly integrated into the ferrule 2. This reduces the number of parts, and it avoids additional alignment features between ferrule 2 and array of lenses 21. Since the front facet of the waveguide layers will be immersed into glue, which is optically transparent, the facets of the waveguide layers do not need optical grade surface quality. This increases the number of methods that can be used to prepare the facets.

Compared to prior art existing multilayer assembly concepts, the tolerances on the thickness control of the waveguide layers cladding is strongly relaxed during manufacturing, changing for example from about ±1.5 microns (µm) to about ±15 µm. The assembly tool 1 used for assembly should not suffer from high fatigue, and thus it may be used for a large number of assemblies.

While the disclosure has been described with reference to an exemplary embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A ferrule for a multilayer waveguide connector, comprising:
a ferrule face of the ferrule comprising mechanical alignment slots arranged in a bidirectional lattice structure, the mechanical alignment slots including first slots disposed in a first direction, the first slots configured to respectively receive one end of waveguide layers, and second slots disposed in a second direction different from the first direction, the second slots configured to respectively receive protrusions transverse from a main surface of the waveguide layers.

2. The ferrule according to claim 1, wherein the second direction is perpendicular to the first direction.

3. The ferrule according to claim 1, wherein the face is an end face.

4. The ferrule according to claim 3, wherein:
the second slots are further aligned to respectively enable teeth of an assembly tool to be inserted therein; and
an array of lenses is disposed on a face opposite to the end face, the lenses arranged so as to come in optical communication with cavities of the second slots where the protrusions of the waveguide layers are to be inserted.

5. The ferrule according to claim 1, wherein at least one of the second slots comprises at least one inward protrusion arranged so as to be able to constrain the position of a protrusion of a waveguide layer inserted in the at least second slot.

6. The ferrule according to claim 5, wherein at least one of the second slots comprises at least two or more inward protrusions arranged in such a way as to be able to constrain the position of a protrusion of a waveguide layer inserted in the at least second slot.

7. The ferrule according to claim 1, wherein the second slots are further aligned to respectively enable teeth of an assembly tool to be inserted therein.

8. The ferrule according to claim 1, wherein the ferrule further comprises, on a face opposite to the face comprising the mechanical alignment slots, an array of lenses which are arranged so as to come in optical communication with the slots of the second slots where the waveguide layers protrusions are to be inserted.

9. A multilayer waveguide connector, comprising:
a ferrule having a face; and
a stack of waveguide layers fixed to the ferrule face;
the ferrule face comprising mechanical alignment slots arranged in a bidirectional lattice structure, the mechanical alignment slots including first slots disposed in a first direction; the first slots configured to respectively receive one end of the stack of waveguide layers, and second slots disposed in a second direction different from the first direction, the second slots configured to respectively receive protrusions transverse from a main surface of the stack of waveguide layers.

10. The multilayer waveguide connector according to claim 9, wherein the waveguide layers are polymer waveguide layers.

11. The multilayer waveguide connector according to claim 9, wherein the protrusions are waveguide cores adapted to guide light within waveguide layers.

* * * * *